UNITED STATES PATENT OFFICE.

HERBERT WATKINS-PITCHFORD, OF WEYBRIDGE, ENGLAND.

PREPARATION OF MEAT PRODUCTS.

1,165,924.      Specification of Letters Patent.      Patented Dec. 28, 1915.

No Drawing.      Application filed August 10, 1914. Serial No. 856,078.

*To all whom it may concern:*

Be it known that I, HERBERT WATKINS-PITCHFORD, a subject of the King of Great Britain, residing at Weybridge, in the county of Surrey, England, have invented new and useful Improvements Relating to the Preparation of Meat Products, of which the following is a specification.

This invention relates to the preparation of meat products, and one object of the invention is to produce an improved meat extract which shall have an enhanced flavor.

A further object of the invention is to produce a flavoring product which may be employed as a flavor independently of the meat extract.

Another object of the invention is to provide meat extracts of increased food value and containing a considerable percentage of predigested proteid matter from the meat.

Other objects will appear from the following description.

It will be convenient first to describe the invention as applied to the making of an extract having an enhanced flavor and increased nutritive value. Lean meat such as is commonly employed for making meat extracts, is used, this being cleaned and having the fat removed therefrom. About one-third of the total quantity of the meat to be treated is then taken and is subjected to the following process. It is cut into slices presenting as large a surface as possible, each slice being from about half an inch to one and a half inches in thickness. These slices are then roasted by heating in an oven for instance, and are basted occasionally during the roasting either by hand or by any known automatic mechanism adapted to dip the meat into the basting liquid, or to apply this basting liquid to the meat at intervals of ten minutes or thereabout. The meat is roasted until it is thoroughly cooked or browned but without being burnt at all. In a quick oven this may take about 15 to 30 minutes according to the thickness of the meat and other conditions. During this roasting and browning of the meat a layer of coagulated proteid material forms on the surface thereof, and the volatile aromatic principle of the roast meat, viz, osmazome, is formed largely at or on the surface. After the roasting, and preferably while the slices of meat are still hot, the surface thereof is scraped with blunt knives, whereby the browned material collected on the surface and containing the flavoring principle, is largely scraped away. It is collected for use as explained below. It is desirable that the scraping shall be effected at once, before the flavor has time to decompose and to become dissipated. The roast meat after the scraping is then pounded or macerated in hot water below the boiling point, as little water as possible being used in proportion to the meat. The resulting fluid is a thick solution of dark brown color containing flavoring principles and also the salts and extractives of the meat. This solution is evaporated *in vacuo* in order to remove the water, the vacuum being as high as possible so that the evaporation may take place at a low temperature, say 115° to 125° Fahrenheit. After the evaporation the resulting product is a semi-solid extract to which is added the material scraped from the roasted slices as before mentioned. The mixture constitutes the new flavoring material, which may be placed at once in hermetically sealed receptacles for use as a flavor for culinary and general purposes. Assuming, however, that what is required is an extract of enhanced flavor, the remaining two-thirds or thereabout of the original quantity of meat taken is then minced and treated in the usual manner with warm water which may be slightly acid or alkaline, in order to obtain from the meat the extract such as is commonly sold under the name of Liebig's extract. If what is required then is simply this extract with an enhanced flavor, the flavoring principle already obtained is mixed with this extract and is placed in suitably closed receptacles for sale. Preferably, however, the process includes the preparation of a predigested food product from the meat and its addition to the extract.

In order to prepare the predigested food product, the "washed" meat, being the minced meat residue after the making of the extract, is mixed with the minced residue of the roasted meat from which the flavoring principle has been obtained as before described. The mixture of the minced material contains a large proportion of proteid matter, and is substantially free from salts and extractives. It is submitted to the action of a ferment preferably in the form of the juice of the papaw fruit, obtained therefrom while it is ripening. The principal constituent of this papaw juice is papain, and papain itself may be used, or any other suitable ferment. Enough water is added to dissolve readily the soluble albumoses and the peptones which are formed, and this water may be very slightly acidulated for instance with hydrochloric acid. The mixture is left to digest at a temperature of about 105° to 115° F. for say two or three hours, after which it is boiled for about half an hour in order to throw down any suspended and coagulable matters, leaving only soluble products already digested in the solution. The mass is strained after the boiling, and the liquid is pressed out and filtered and is afterward concentrated by evaporation preferably in a partial vacuum. The concentrated product contains a large part of the proteid matter of the meat in a form immediately assimilable in the human body. This concentrated predigested product is then mixed with the meat extract and the flavoring principle prepared as above set forth, thus giving a meat extract or beef-tea which has the following advantages: It has a greatly enhanced flavor making it more tasty and palatable, while its nutritive value is greatly increased owing to the large amount of predigested proteid matter contained in it. The product can be made by the process above set forth, to contain 30% to 40% of soluble albumoses and peptones, that is to say the completed products of digestion of the lean meat. The product is therefore not only tasty, but is of great value as a food for invalids, as well as for general use.

It is not of course essential that precisely one-third of the meat should be subjected to the roasting process for preparing the flavoring principle, but the proportions may be varied according to the object in view. With the proportions mentioned, however, highly satisfactory results have been obtained in experiments.

Having thus described my invention what I claim as new and desire to secure by Letters Patent is:—

1. A process for preparing a highly flavored product from meat, consisting in cutting the meat into slices, roasting the slices until they are well browned, scraping from the surface of the slices while still warm the layer of browned matter containing the flavoring principle of the meat formed by the roasting operation, macerating the meat residue with hot water, concentrating the resultant solution by evaporation, and mixing therewith the surface matter scraped from the meat after the roasting.

2. A process for preparing a highly flavored product from meat, consisting in cutting the meat into slices, roasting the slices until they are well browned, scraping from the surface of the slices while still warm the layer of browned matter containing the flavoring principle of the meat formed by the roasting operation, macerating the meat residue with a small quantity of hot water whereby a thick brown solution is obtained, evaporating from this solution in vacuo at a relatively low temperature the water contained therein, and mixing with the resultant semi-solid extract the flavoring matter obtained by scraping from the surface of the roasted meat.

3. A process for preparing a highly flavored product from meat, consisting in cutting the meat in slices, roasting the slices until they are well browned, scraping from the surface of the slices while still warm the layer of browned matter containing the flavoring principle of the meat formed by the roasting operation, macerating the meat residue with hot water, concentrating the resultant solution by evaporation, and mixing therewith the surface matter scraped from the meat after the roasting, making an extract containing salts and extractives from a further quantity of lean meat, by means of warm water, and adding thereto the flavoring matter.

4. A process for preparing a highly flavored product from meat, consisting in cutting some of the meat into slices, roasting the same, scraping off the browned surface, macerating with warm water, the flavoring matter, salts and extractives remaining in the roasted meat, evaporating the solution by distillation of the water therefrom in vacuo at a temperature much below the normal boiling point, mixing with this concentrated extract the scraped meat product, preparing an extract with warm water from a further quantity of the fresh meat, and mixing with this extract the highly flavored extract obtained from the roasted portion of the meat.

5. A process for preparing a flavored meat product consisting in roasting a portion of the meat in the form of slices, scraping therefrom the flavoring principles developed during the roasting and the other soluble constituents, preparing an extract with warm water from a further portion of fresh meat and adding to the said extract the highly flavored extract obtained from the roasted meat, treating the fresh meat residue with a ferment and warm water, concentrating the predigested food product so obtained, and adding it to the flavored extract.

6. A process for preparing a flavored meat product consisting in roasting a portion of the meat and scraping therefrom the flavoring principles developed during the roasting, extracting with warm water the soluble constituents from a further portion of minced fresh meat, treating the residual fresh meat material with a ferment and with warm water whereby a predigested product is obtained, concentrating all of said products, and mixing them together.

7. A process for preparing a flavored meat product consisting in roasting a portion of the meat and scraping therefrom the flavoring principles developed during the roasting, mincing the residual roasted meat material, extracting with warm water the soluble constituents from a further portion of minced fresh meat, treating the residual fresh meat material, and also the residual minced roasted meat material with a ferment and with warm water whereby a predigested product is obtained, concentrating all of said products, and mixing them together.

8. A process for preparing a flavored meat product consisting in roasting a portion of the meat and scraping therefrom the flavoring principles developed during the roasting, extracting with warm water the soluble constituents from a further portion of minced fresh meat, treating the residual fresh meat material with papaw juice and warm water, concentrating the predigested product obtained, and concentrating also the extract obtained from the fresh meat, and finally mixing together the said concentrated products and the flavoring matter.

9. The process for preparing a highly flavored and nutritive meat extract consisting in slicing lean meat, roasting the same, scraping the browned surface matter from the roasted meat, macerating with warm water, evaporating the solution by heating under a reduced pressure, mixing therewith the scraped surface material, preparing an extract with warm water from another portion of fresh meat, concentrating this extract by evaporation, treating the insoluble meat residues of both of the above operations with warm water and a ferment, boiling the solution obtained, concentrating the same, and mixing together the flavoring matter obtained from the roasted meat, the concentrated extract of the fresh meat, and the predigested product.

10. As an article of manufacture, an extract of enhanced flavor composed of a concentrated mixture of flavoring principle consisting of the surface material scraped from roasted meat, a concentrated extract of roasted meat and an extract of minced meat.

11. As an article of manufacture, a predigested food product composed of a concentrated mixture of flavoring matter consisting of the surface material scraped from roasted meat, a concentrated extract of roasted meat, a concentrated extract of minced meat, and predigested insoluble meat material.

In witness whereof, I have hereunto signed my name this 31st day of July 1914, in the presence of two subscribing witnesses.

H. WATKINS-PITCHFORD.

Witnesses:
 HUBERT A. GILL,
 H. W. BLAKE.

Copies of this patent may be obtained for five cents each, by addressing the "Commissioner of Patents, Washington, D. C."